US005238224A

United States Patent [19]

Horsting

[11] Patent Number: 5,238,224

[45] Date of Patent: Aug. 24, 1993

[54] DRY COIL

[75] Inventor: John J. Horsting, Grafton, Va.

[73] Assignee: Siemens Automotive L.P., Auburn Hills, Mich.

[21] Appl. No.: 932,847

[22] Filed: Aug. 20, 1992

[51] Int. Cl.⁵ .............................................. F16K 31/06

[52] U.S. Cl. .......................... 251/129.16; 251/129.15; 239/585.3

[58] Field of Search ...................... 251/129.16, 129.21, 251/129.15, 368; 239/585.3

[56] References Cited

U.S. PATENT DOCUMENTS 2,860,850 11/1958 Rhodes et al. ................ 251/129.21
3,817,491 6/1974 Burckhardt et al. ........... 251/129.21
3,960,361 6/1976 York .............................. 251/129.16
4,725,040 2/1988 Fornuto et al. ................ 251/129.15

*Primary Examiner*—Arnold Rosenthal
*Attorney, Agent, or Firm*—George L. Boller; Russel C. Wells

[57] ABSTRACT

The coil of a solenoid-operated valve is fluid-isolated from fluid whose flow is controlled by the valve by providing the solenoid with an imperforate transverse end wall having a radially inner annular ferromagnetic zone forming one portion of the stator, a radially outer annular ferromagnetic zone forming another portion of the stator, and a radially intermediate annular zone of non-magnetic material separating the radially inner and radially outer ferromagnetic zones.

18 Claims, 1 Drawing Sheet

DRY COIL

FIELD OF THE INVENTION

This invention relates generally to solenoids. More specifically, it relates to a novel construction for a solenoid's stator that is effective to keep the solenoid's coil isolated from fluid that is conveyed through a valve that is controlled by the solenoid.

BACKGROUND AND SUMMARY OF THE INVENTION

In certain solenoid-controlled valves, the solenoid is exposed to fluid whose flow is controlled by the valve. Generally speaking, it is undesirable for the fluid to come in contact with the solenoid's coil. For example, intrusion of some fluids may degrade insulation covering the wire forming the coil, and this may lead to shorting of turns of the coil, and ultimately loss of coil performance. Accordingly, it has been appropriate to adopt protective measures for guarding against such intrusion.

However, it is important that protective measures should not have a degrading effect on the magnetic circuit because it may then be necessary to enlist other measures, such as enlarging the size of the solenoid for example, and these measures may be undesirable from other standpoints, such as cost or package size for example.

The present invention relates to a novel construction for a solenoid that can keep the coil dry without detrimentally compromising the solenoid's magnet circuit. Described briefly and in a general way, the invention comprises providing the solenoid with an imperforate transverse end wall that separates the coil from the fluid and that has radially outer and radially inner annular zones of magnetic material forming respective portions of the stator separated from each other by a radially intermediate annular zone of non-magnetic material. Various constructional techniques for fabricating this end wall will be described.

A drawing accompanies the disclosure and depicts a presently preferred embodiment of the invention according to the best mode contemplated at this time for carrying out the invention.

DESCRIPTION OF THE PREFERRED EMBODIMENT

Figure 1:
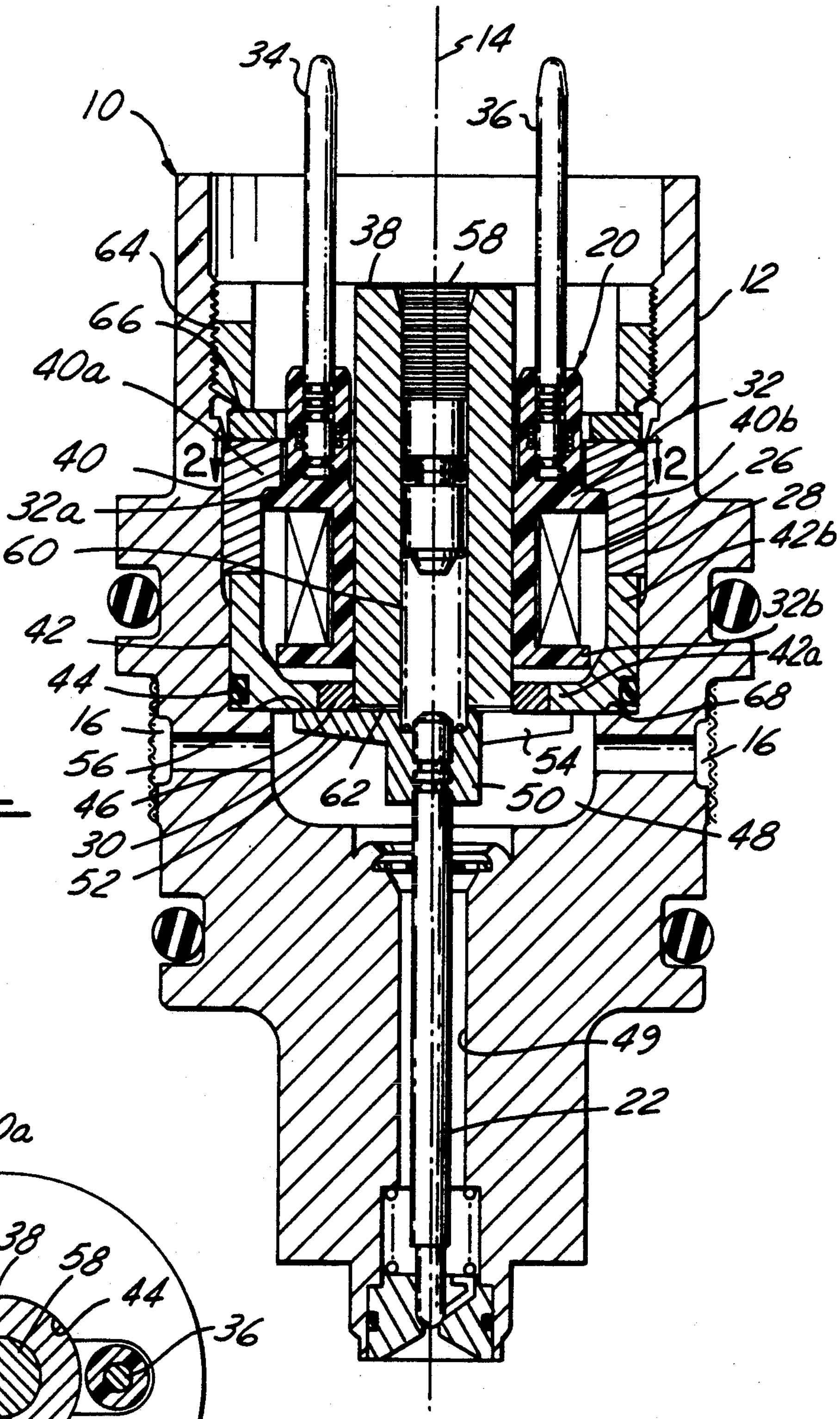
FIG. 1 is a longitudinal cross sectional view through an exemplary solenoid-operated valve embodying principles of the invention.
Figure 2:
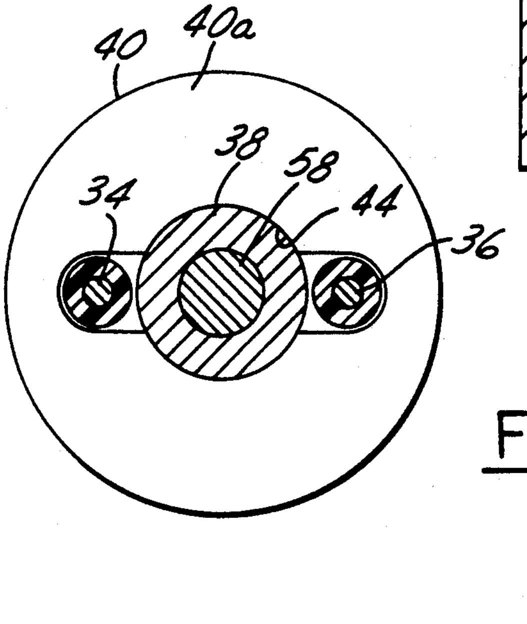
FIG. 2 is a transverse cross sectional view taken in the direction of arrows 2—2 in FIG. 1.

FIGS. 1 and 2 show an electromechanical fuel injector 10 comprising a generally cylindrical body 12 having a longitudinal axis 14. Fuel injector 10 is a side-feed type having a fuel inlet 16 in the sidewall of body 12 so that pressurized fuel enters the fuel injector through its sidewall when the fuel injector is installed in a sealed manner in an injector-receiving socket (not shown) of an engine-mounted component such as a manifold, fuel rail, or cylinder head. A nozzle 18 from which fuel is injected is disposed at the lower end of body 12. On the interior of body 12, fuel injector 10 comprises a solenoid 20 that operates a needle valve 22 for selective seating on and unseating from a valve seat 24 at the nozzle end.

FIG. 1 shows needle valve 22 seated on valve seat 24 thereby closing the fuel injector to flow between inlet 16 and nozzle 18.

Solenoid 20 comprises an electromagnetic coil 26, a stator 28 and an armature 30. Coil 26 is a length of insulated wire wound into a tubular configuration on a bobbin 32 coaxially disposed within body 12. Respective ends of the wire are joined to proximal ends of respective electrical terminals 34, 36 that are embedded in bobbin 32 and extend away from the bobbin parallel with axis 14.

Stator 28 is composed of several ferromagnetic parts assembled together. A first part is a circular cylindrical tube 38 that is disposed interiorly of and coaxial with bobbin 32. A second part is an upper end ring 40, and a third, a lower end ring 42.

Upper end ring 40 has a circular cylindrical shape, comprising an end wall 40*a*, and a sidewall 40*b*. End wall 40*a* overlies the top of coil 26 and an upper flange 32*a* of bobbin 32, having a hole 44 shaped to allow tube 38 and those portions of bobbin 32 within which terminals 34, 36 are embedded to pass through. Side wall 40*b* is disposed radially outwardly of and in covering relation to an upper portion of coil 26 and bobbin 32.

Lower end ring 42 also has a circular cylindrical shape, comprising an end wall 42*a*, and a sidewall 42*b*. Side wall 42*b* is disposed radially outwardly of and in covering relation to a lower portion of coil 26 and bobbin 32. End wall 42*a* is disposed in underlying relation to the lower end of coil 26 and a lower flange 32*b* of bobbin 32, but stops short radially of tube 38. Lower end ring 42 is provided at the outer corner intersection of its end wall and sidewall with a circular groove that contains an O-ring seal 44. This seal provides fluid-tight sealing of lower end ring 42 to the inside of the sidewall of body 12.

The annular space that lies radially between end wall 42*a* and tube 38 is occupied by a ring 46 of non-magnetic material. Ring 46 is joined with lower end ring 42 and tube 38 in fluid-tight manner, by means to be hereinafter described in more detail, such that the three form an annular imperforate transverse end wall for fluid-isolating coil 26 from an interior space 48 of body 12 into which fluid is introduced via inlet 16. A passageway 49 extends co-axially from space 48 to valve seat 24.

Armature 30 is disposed within space 48 and has a center hub 50 to which the upper end of needle valve 22 is affixed and around the upper axial end of which a circular flange 52 is disposed. Flange 52 may include several radial slots 54 extending from its outer perimeter to center hub 50. Armature 30 presents a flat upper end face 56 to the aforementioned imperforate transverse end wall defined by lower end ring 42, non-magnetic ring 46, and tube 38.

Upper end face 56 fully radially overlaps tube 38 and non-magnetic ring 46, and partially radially overlaps lower end ring 42. An adjustment mechanism 58 is disposed in tube 38, compressing a helical coil spring 60 between itself and center hub 50 of armature 30. When solenoid 20 is not energized, spring 60 forces armature 30 downwardly, causing needle valve 22 to seat on valve seat 24, thereby closing the flow path through the fuel injector between inlet 16 and nozzle 18.

A working gap 62 exists between armature 30 and stator 28, and in the de-energized condition of solenoid 20 it has a maximum axial dimension. When the solenoid is energized to unseat needle 22 from seat 24, magnetic flux is created in stator 28, armature 30, and working gap 62, attracting the armature toward the stator so as to reduce the axial extent of the working gap.

Non-magnetic ring 46 protrudes slightly toward armature 30 from the co-planar lower end faces of lower end ring 42 and tube 38 so that it, and not lower end ring 42 and tube 38, will be abutted by the upward displacement of the armature. In this way working gap 62 will be reduced in response to solenoid energization, but not to zero, and this is desirable to avoid armature sticking on the stator when solenoid 20 is again de-energized to re-seat needle 22 on valve seat 24.

Working gap 62 comprises radially inner and radially outer annular zones. The radially inner annular zone of the working gap is bounded axially by the lower end face of tube 38 and by an underlying annular zone of armature 30. The radially outer annular zone of working gap 62 is bounded axially by the lower end face of the radially inner margin of end wall 38 and by an underlying annular zone of armature 30. Magnetic flux passes in one direction through the radially outer annular zone of the working gap, and in the opposite direction through the radially inner annular zone of the working gap.

There are different ways to relate non-magnetic ring 46 to tube 38 and lower end ring 42 so as to create the fluid-tight transverse end wall for the solenoid. One way is to form non-magnetic ring 46 as a separate piece, such as from non-magnetic stainless steel, and press-fit it between tube 38 and lower end ring 42. Another way is to form non-magnetic ring 46 as a separate piece and fit it to tube 38 and lower end ring 42 by means of seals. Still another way is to create non-magnetic ring 46 by molding it in place between tube 38 and lower end ring 42, such as by plastic injection molding. A preferred embodiment comprises making the three parts a unitary structure by utilizing magnetic powdered metal for tube 38 and lower end ring 42 and non-magnetic metal powder for non-magnetic ring 46, and then sintering them together.

For best efficiency, the finished solenoid should have good interfaces at the junction of upper end ring 40 and lower end ring 42, and at the junction of upper end ring 40 and tube 38. In the illustrated embodiment, a nut 64 is threaded into the upper end of the interior of body 12 and tightened to exert through an annular spacer 66 an axial force that urges end rings 40 and 42 together and the latter against an internal shoulder 68. An electrical connector plug (not shown) may now be mated with terminals 34, 36 to establish electrical connection of the solenoid coil to a control circuit for operating the fuel injector.

While a presently preferred embodiment of the invention has been illustrated and described, it should be appreciated that principles are applicable to other embodiments.

What is claimed is:

1. A solenoid comprising a tubular electromagnetic coil and an associated magnetic circuit for conducting magnetic flux issued by said coil comprising a stator, an armature, and a working gap between said stator and said armature, said stator comprising radially inner and radially outer sidewalls extending axially of said coil on its inside and outside respectively, characterized in that the longitudinal end portion of said coil that is toward said working gap is separated from said working gap by an imperforate transverse end wall that provides fluid isolation of said coil from a wet fluid zone within which said working gap is disposed, and said imperforate transverse end wall comprises a radially outer annular zone forming a portion of said stator that conducts magnetic flux between said armature and said radially outer sidewall of said stator, a radially inner annular zone forming a portion of said stator that conducts magnetic flux between said armature and said radially inner sidewall of said stator, and a radially intermediate annular zone of non-magnetic material separating said radially inner and radially outer zones in which said non-magnetic material protrudes toward said armature from said inner and outer sidewalls so that when the solenoid is energized, it, rather than said inner and outer sidewalls, will be abutted by said armature.

2. A solenoid as set forth in claim 1 in which said non-magnetic material comprises a non-magnetic stainless steel ring.

3. A solenoid as set forth in claim 1 in which said non-magnetic material comprises a plastic ring.

4. A solenoid as set forth in claim 1 in which said radially inner and radially outer sidewalls are tubular.

5. A solenoid as set forth in claim 1 in which said radially outer annular zone of said imperforate transverse end wall is provided in a part which includes at least a portion of said radially outer sidewall.

6. A solenoid as set forth in claim 1 in which said non-magnetic material comprises a sintered non-metallic ring.

7. A solenoid comprising a tubular electromagnetic coil and an associated magnetic circuit for conducting magnetic flux issued by said coil comprising a stator, an armature, and a working gap between said stator and said armature, said stator comprising radially inner and radially outer sidewalls extending axially of said coil on its inside and outside respectively, characterized in that the longitudinal end portion of said coil that is toward said working gap is separated from said working gap by an imperforate transverse end wall that provides fluid isolation of said coil from a wet fluid zone within which said working gap is disposed, and said imperforate transverse end wall comprises a radially outer annular zone forming a portion of said stator that conducts magnetic flux between said armature and said radially outer sidewall of said stator, a radially inner annular zone forming a portion of said stator that conducts magnetic flux between said armature and said radially inner sidewall of said stator, and a radially intermediate annular zone of non-magnetic material separating said radially inner and radially outer zones in which said non-magnetic material comprises a sintered non-metallic ring.

8. A solenoid as set forth in claim 7 in which said radially inner and radially outer sidewalls comprise sintered metal rings.

9. A solenoid as set forth in claim 7 in which said radially inner and radially outer sidewalls' sintered metal rings form a unitary sintered structure with said sintered non-metallic ring.

10. A solenoid-operated fluid valve comprising a valve portion that controls fluid flow through the valve and that is operatively coupled with a solenoid comprising a tubular electromagnetic coil and an associated magnetic circuit for conducting magnetic flux issued by said coil comprising a stator, an armature, and a working gap that is disposed between said stator and said armature in the fluid flow through said valve portion, said stator comprising radially inner and radially outer sidewalls extending axially of said coil on its inside and outside respectively, characterized in that a longitudinal end portion of said coil that is toward said working gap is separated from said working gap and the fluid flow through said valve portion by an imperforate transverse end wall that provides fluid isolation of said coil from fluid flow in said valve portion, and said imperforate transverse end wall comprises a radially outer annular zone forming a portion of said stator that conducts magnetic flux between said armature and said radially outer sidewall of said stator, a radially inner annular zone forming a portion of said stator that conducts magnetic flux between said armature and said radially inner sidewall of said stator, and a radially intermediate annular zone of non-magnetic material separating said radially inner and radially outer zones in which said non-magnetic material comprises a sintered non-metallic ring.

11. A solenoid-operated fluid valve as set forth in claim 10 in which said radially inner and radially outer sidewalls comprise sintered metal rings.

12. A solenoid-operated fluid valve as set forth in claim 11 in which said radially inner and radially outer sidewalls' sintered metal rings form a unitary sintered structure with said sintered non-metallic ring.

13. A solenoid-operated fluid valve comprising a valve portion that controls fluid flow through the valve and that is operatively coupled with a solenoid comprising a tubular electromagnetic coil and an associated magnetic circuit for conducting magnetic flux issued by said coil comprising a stator, an armature, and a working gap that is disposed between said stator and said armature in the fluid flow through said valve portion, said stator comprising radially inner and radially outer sidewalls extending axially of said coil on its inside and outside respectively, characterized in that a longitudinal end portion of said coil that is toward said working gap is separated from said working gap and the fluid flow through said valve portion by an imperforate transverse end wall that provides fluid isolation of said coil from fluid flow in said valve portion, and said imperforate transverse end wall comprises a radially outer annular zone forming a portion of said stator that conducts magnetic flux between said armature and said radially outer sidewall of said stator, a radially inner annular zone forming a portion of said stator that conducts magnetic flux between said armature and said radially inner sidewall of said stator, and a radially intermediate annular zone of non-magnetic material separating said radially inner and radially outer zones in which said non-magnetic material protrudes toward said armature from said inner and outer sidewalls so that when the solenoid is energized, it, rather than said inner and outer sidewalls, will be abutted by said armature.

14. A solenoid-operated fluid valve as set forth in claim 13 in which said non-magnetic material comprises a non-magnetic stainless steel ring.

15. A solenoid-operated fluid valve as set forth in claim 13 in which said non-magnetic material comprises a plastic ring.

16. A solenoid-operated fluid valve as set forth in claim 13 in which said radially inner and radially outer sidewalls are tubular.

17. A solenoid-operated fluid valve as set forth in claim 13 in which said radially outer annular zone of said imperforate transverse end wall is provided in a part which includes at least a portion of said radially outer sidewall.

18. A solenoid-operated fluid valve as set forth in claim 13 in which said non-magnetic material comprises a sintered non-metallic ring.

* * * * *